(12) United States Patent
Mori et al.

(10) Patent No.: US 11,038,245 B2
(45) Date of Patent: Jun. 15, 2021

(54) BATTERY WIRING MODULE

(71) Applicant: SUMITOMO WIRING SYSTEMS, LTD., Mie (JP)

(72) Inventors: Ryota Mori, Mie (JP); Hiroshi Sato, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/536,764

(22) Filed: Aug. 9, 2019

(65) Prior Publication Data

US 2020/0075914 A1    Mar. 5, 2020

(30) Foreign Application Priority Data

Aug. 29, 2018  (JP) .............................. JP2018-160506

(51) Int. Cl.
*H01R 3/00* (2006.01)
*H01M 50/502* (2021.01)
*H01R 25/16* (2006.01)

(52) U.S. Cl.
CPC ........ *H01M 50/502* (2021.01); *H01R 25/162* (2013.01); *H01M 2220/20* (2013.01)

(58) Field of Classification Search
CPC ........ H02G 5/08; Y02E 60/12; H01R 9/2458; H01M 2/20; H01M 2/204; H01M 2/206
USPC .......... 439/251, 500, 627, 949; 429/59, 121, 429/151, 158, 160, 170, 211
See application file for complete search history.

(56) References Cited

U.S. PATENT DOCUMENTS

| | | | | |
|---|---|---|---|---|
| 5,073,119 A * | 12/1991 | Soes | ..................... | H01R 12/585 439/82 |
| 7,097,485 B1 * | 8/2006 | Wang | ..................... | H01R 13/24 439/289 |
| 7,214,746 B2 * | 5/2007 | Voskoboynikov | ..... | B01J 31/143 502/103 |
| 7,264,500 B2 * | 9/2007 | Noguchi | ............. | H01M 2/0421 439/500 |
| 8,038,487 B2 * | 10/2011 | Tsuchiya | ................. | H01M 2/30 439/765 |
| 8,329,331 B2 * | 12/2012 | Han | ...................... | H01M 2/206 429/121 |
| 8,399,128 B2 * | 3/2013 | Kim | ...................... | H01M 2/206 429/211 |
| 8,492,024 B2 * | 7/2013 | Ogasawara | ........... | H01M 2/206 429/170 |
| 8,777,668 B2 * | 7/2014 | Ikeda | .................. | H01M 2/1077 439/627 |

(Continued)

FOREIGN PATENT DOCUMENTS

JP    2013-37988    2/2013

*Primary Examiner* — Thanh Tam T Le
(74) *Attorney, Agent, or Firm* — Greenblum & Bernstein, P.L.C.

(57) ABSTRACT

Provided is a battery wiring module that can hold busbars until they are connected to a secondary battery. A busbar is configured to connect battery terminals of a plurality of battery cells to each other, and has a recess portion that is recessed in a Z direction, which is a stack direction in which a housing is stacked on the battery cells. The battery wiring module includes a busbar holding portion configured to be inserted into the recess portions, and engage with and hold the busbar in the stack direction in which the housing is stacked on the battery cells.

3 Claims, 7 Drawing Sheets

(56) References Cited

U.S. PATENT DOCUMENTS

| | | | |
|---|---|---|---|
| 8,976,534 B2* | 3/2015 | Warmuth | H01M 2/202 |
| | | | 361/748 |
| 9,508,464 B2* | 11/2016 | Nakayama | H01B 17/56 |
| 9,543,711 B2* | 1/2017 | Nakayama | H01R 13/6683 |
| 9,871,361 B2* | 1/2018 | Imai | H02G 5/025 |
| 9,905,832 B2* | 2/2018 | Nakayama | H01M 10/482 |
| 10,014,510 B2* | 7/2018 | Ichikawa | H01M 2/206 |
| 10,230,219 B2* | 3/2019 | Aoki | H02B 1/01 |
| 10,381,815 B2* | 8/2019 | Shoji | H01M 10/48 |
| 10,581,055 B2* | 3/2020 | Sato | H01M 2/1077 |
| 10,705,154 B2* | 7/2020 | Kataoka | G01R 31/396 |
| 10,826,134 B2* | 11/2020 | Zeng | H01M 10/425 |
| 10,854,860 B2* | 12/2020 | Yamane | H01M 2/20 |
| 10,855,006 B2* | 12/2020 | Ogasawara | H01M 10/486 |
| 2014/0158396 A1 | 6/2014 | Nakayama | |
| 2020/0075915 A1* | 3/2020 | Mori | H01M 2/305 |

* cited by examiner

BATTERY WIRING MODULE

TECHNICAL FIELD

The present invention relates to a battery wiring module.

BACKGROUND ART

As disclosed in JP 2013-37988A for example, in vehicles such as electric automobiles and hybrid automobiles, a high-voltage secondary battery, which is installed as a power supply for driving the vehicle when the vehicle is traveling, is provided with a battery wiring module. In the battery wiring module, a module-side terminal is connected to a busbar (a connecting member in JP 2013-37988A1) that connects a plurality of battery cells constituting the secondary battery to each other.

JP 2013-37988A is an example of related art.

SUMMARY OF THE INVENTION

Meanwhile, in the battery wiring modules as described above, it is conceivable that, for example, the busbar and the module-side terminal that are housed in a housing are connected to the secondary battery, or the module-side terminal that is housed in the housing is connected to the busbar connected to the secondary battery. However, for example, a case has not been considered in which the module-side terminal is housed in the housing, and then the busbar is attached to the housing. In this case, for example, the busbar needs to be held until it is connected to the secondary battery, but such a battery wiring module has not been developed.

The present invention was made to solve the aforementioned problem, and it is an object thereof to provide a battery wiring module that can hold a busbar until it is connected to a secondary battery.

Solution to Problem

In order to solve the aforementioned problem, a battery wiring module includes: a module-side terminal configured to be electrically connected to a busbar for connecting battery terminals of a plurality of battery cells to each other; a wire that has one end to which the module-side terminal is connected; and a housing in which the wire and the module-side terminal are housed, wherein the busbar is configured to connect the battery terminals of the plurality of battery cells to each other, and has a recess portion that is recessed in a stack direction in which the housing is stacked on the battery cells, and the battery wiring module further includes a busbar holding portion configured to be inserted into the recess portion, and engage with and hold the busbar in the stack direction in which the housing is stacked on the battery cells.

According to this aspect, as a result of including the busbar holding portion configured to engage with and hold the busbar in the stack direction in which the housing is stacked on the battery cells, the battery wiring module can hold the busbar on the battery wiring module (housing) until the busbar is connected to the secondary battery.

In the above-described battery wiring module, preferably, the busbar holding portion includes holding pieces that are located on two sides, in the stack direction, of the busbar, and the holding pieces each have a restricting portion configured to restrict movement of the busbar in a disengaging direction in which the busbar disengages from the busbar holding portion.

According to this aspect, as a result of the holding pieces each having a restricting portion configured to restrict movement of the busbar in the disengaging direction, it is possible to prevent the busbar from disengaging from the busbar holding portion.

In the above-described battery wiring module, preferably, the restricting portion is a projection that projects from the holding piece and is capable of abutting against the busbar in the disengaging direction.

According to this aspect, as a result of employing, as the restricting portion, a projection that projects from the holding piece and is capable of abutting against the busbar in the disengaging direction, it is possible to prevent the busbar from disengaging from the busbar holding portion.

In the above-described battery wiring module, preferably, the restricting portion includes a biasing force applying portion configured to apply a biasing force to the busbar in a plate-thickness direction of the busbar.

According to this aspect, a biasing force applied by the biasing force applying portion can be used to prevent disengagement of the busbar.

Advantageous Effects of Invention

According to the battery wiring module of the present invention, it is possible to hold a busbar until it is connected to a secondary battery.

EMBODIMENTS OF THE INVENTION

Figure 1:
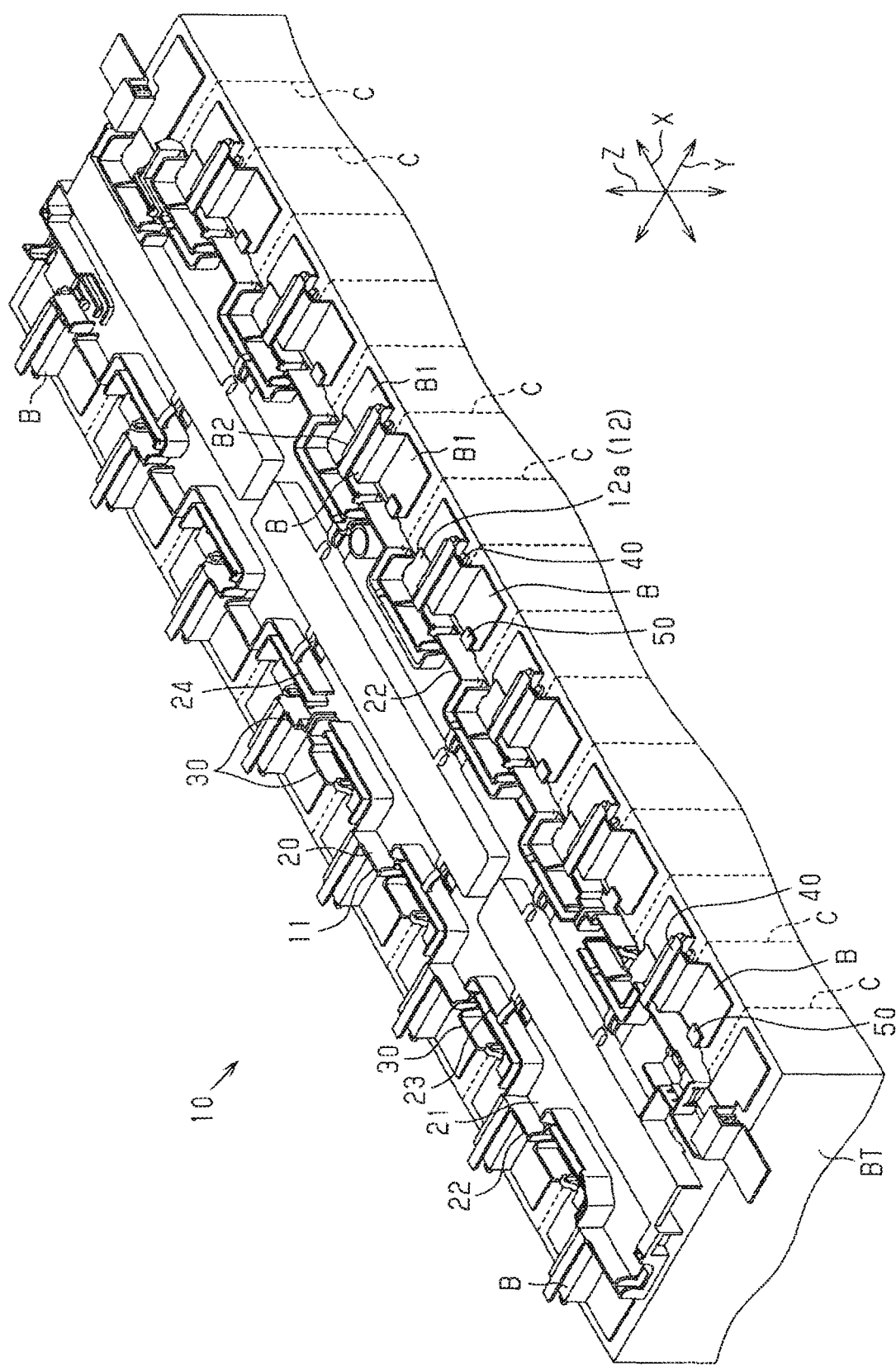
FIG. 1 is a perspective view illustrating a battery wiring module according to an embodiment.

Hereinafter, an embodiment of a battery wiring module will be described. Note that, in the drawings, part of a configuration may be exaggerated or simplified, for ease of description. Furthermore, dimensions of constituent components may be scaled differently from the actual ones.

As shown in FIG. 1, a battery wiring module 10 is mounted on the upper surface of a substantially cuboid secondary battery BT. Note that the secondary battery BT is installed in an electric automobile, a hybrid automobile, or the like, and supplies electric power to a vehicle traveling motor. Furthermore, the secondary battery BT is supplied with electric power from the traveling motor or a power generation motor depending on charge conditions or vehicle driving conditions. Here, in the following, description will be made assuming that, out of three directions X, Y, and Z in FIG. 1 that are orthogonal to each other, the X direction is a direction in which battery cells are lined up, the Y direction is a width direction of the battery wiring module, and the Z direction is a vertical direction.

The secondary battery BT includes a plurality of battery cells C, and not-shown positive and negative electrodes of the battery cells C are arranged on the battery wiring module 10 side (upper side).

The plurality of battery cells C are lined up in the X direction. At this time, the battery cells C are lined up such that their positive and negative electrodes, which serve as battery terminals, are alternately arranged in the direction in which the battery cells C are lined up, that is, in the X direction. Busbars B are provided for these terminals, each busbar being configured to connect adjacent terminals, that is, a positive electrode and a negative electrode, to each other. In other words, the battery cells C are connected in series by the busbars B. The busbars B of the present embodiment are connected to the positive electrodes and the negative electrodes of the battery cells C by welding, for example.

Figure 4:
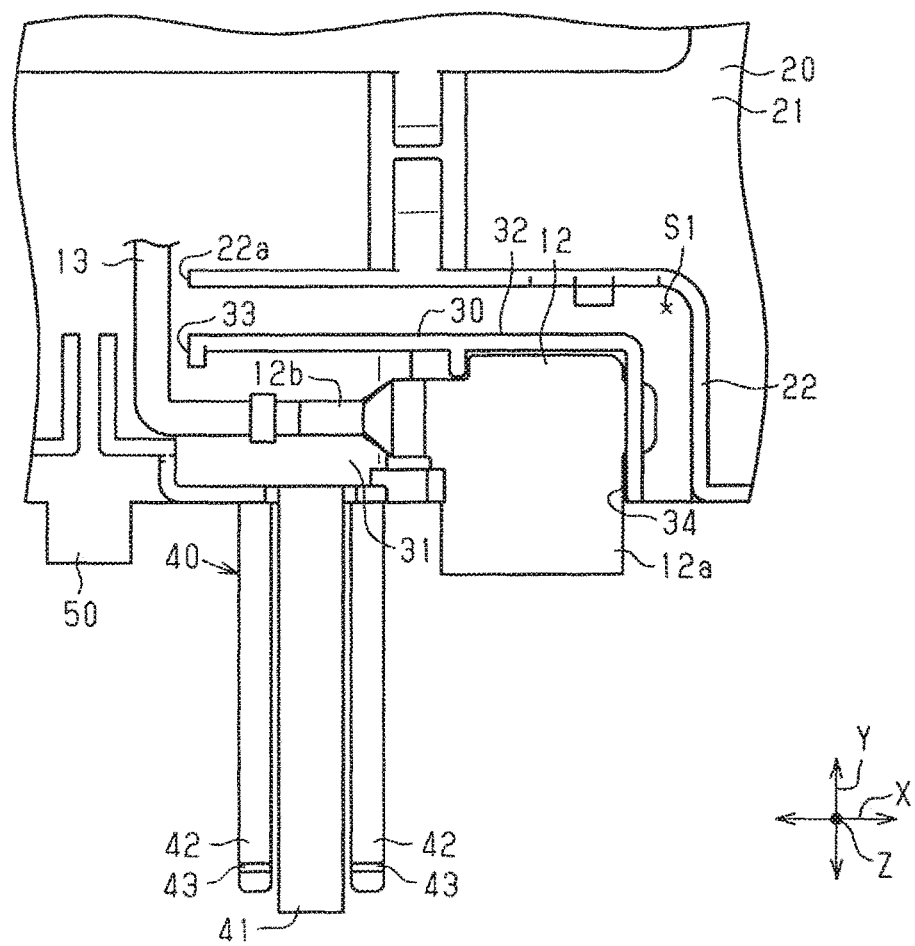
FIG. 4 is a plane view of the battery wiring module according to the embodiment, illustrating a state in which the busbar is omitted.
Figure 5:
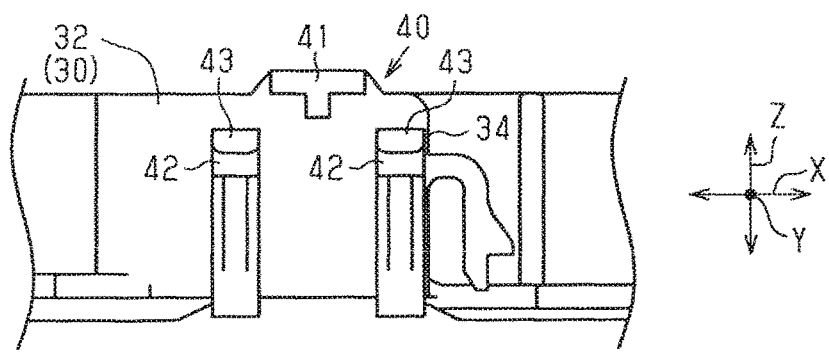
FIG. 5 is a side view of the battery wiring module according to the embodiment, illustrating the state in which the busbar and the module-side terminal are omitted.

As shown in FIG. 1, the battery wiring module 10 includes a housing 11, a plurality of module-side terminals 12, and a plurality of wires 13 (see FIG. 4).

The housing 11 has a shape such that, for example, the size in the X direction, which is the direction in which the battery cells C are lined up, is greater than the size in the Y direction, which is the width direction. The upper side of the housing 11 is open, and the opening is designed to be closed by a not-shown cover.

The housing 11 is made of, for example, a resin member. The housing 11 includes wire accommodating portions 20 in each of which a wire is accommodated, and terminal accommodating portions 30 in each of which a module-side terminal 12 is accommodated.

As shown in FIG. 4, each module-side terminal 12 has a flat plate-shaped terminal body 12a, and a barrel portion 12b that is contiguous from the terminal body 12a. The barrel portion 12b is electrically connected to the core wire of a wire 13.

As shown in FIGS. 1 to 4, the wire accommodating portions 20 of the housing 11 are compartments of the housing 11 that are formed by a bottom portion 21 and a side wall 22 that extends from the outer edge portion of the bottom portion 21. The wire accommodating portions 20 include a plurality of recess portions 23 and 24 arranged in the direction in which the plurality of battery cells C are lined up, the plurality of recess portions 23 and 24 being recessed in the direction that is orthogonal to the direction in which the plurality of battery cells C are lined up, and is orthogonal to a direction in which the housing 11 is stacked on the battery cells C, that is, the plurality of recess portions 23 and 24 being recessed in the width direction Y. Each recess portion 23 receives one terminal accommodating portion 30. Each recess portion 24 receives two terminal accommodating portions 30.

As shown in FIGS. 1 to 4, the terminal accommodating portions 30 of the housing 11 that are received in the recess portions 24 are compartments of the housing 11 that are formed by a bottom portion 31 and a side wall 32 that extends from the outer edge portion of the bottom portion 31. The terminal accommodating portions 30 are substantially cuboid shaped with a long length in the X direction. There is a gap SL between a terminal accommodating portion 30 and a recess portion 24 of the corresponding wire accommodating portion 20, the gap SI extending in the X direction of the terminal accommodating portion 30 and being provided to one side in the Y direction thereof. Furthermore, the side wall 32 of the terminal accommodating portion 30 has an opening 33 that is open inward in the Y direction (to the wire accommodating portion 20 side), and an opening 34 that is open outward in the Y direction (to the side opposite to the wire accommodating portion 20).

Figure 2:
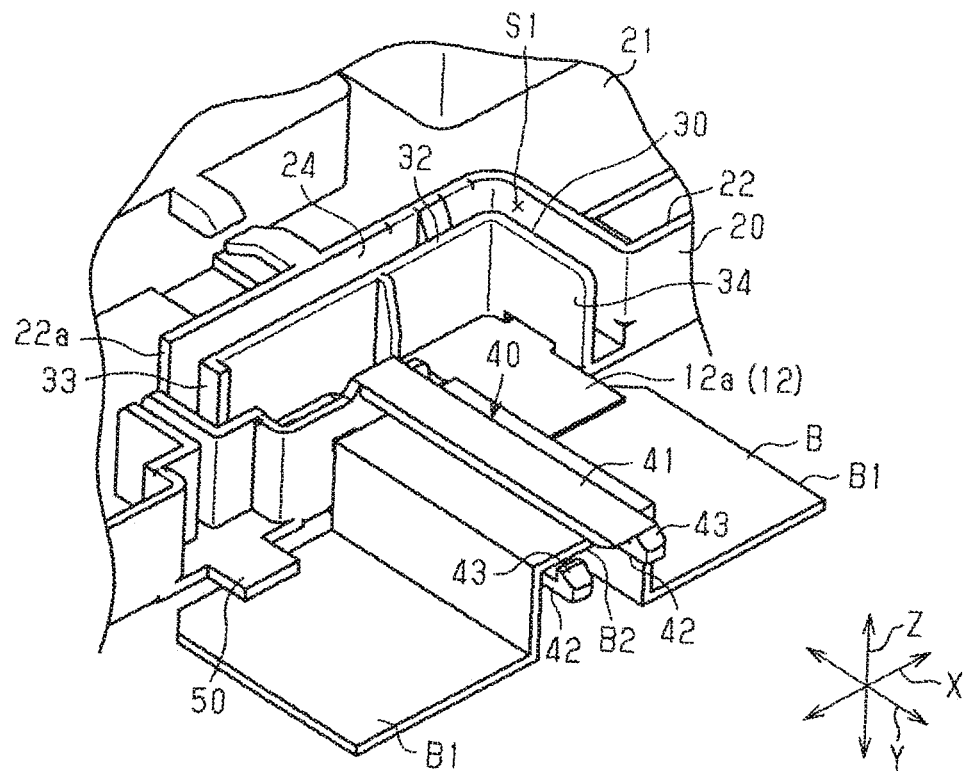
FIG. 2 is a perspective view illustrating part of the battery wiring module according to the embodiment.
Figure 3:
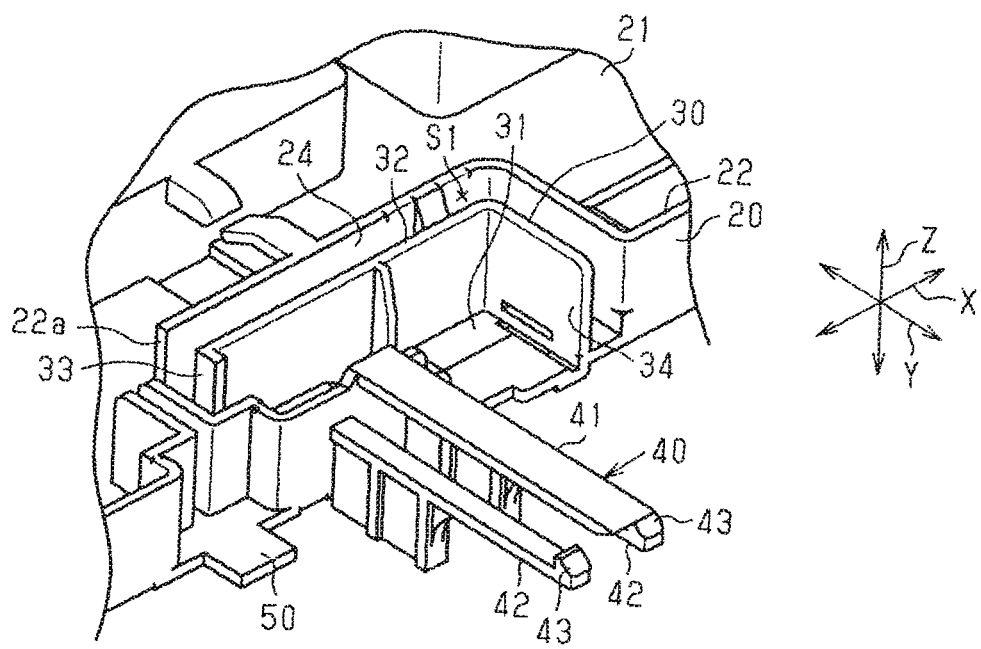
FIG. 3 is a perspective view of the battery wiring module according to the embodiment, illustrating a state in which a busbar and a module-side terminal are omitted.

As shown in FIGS. 2 and 3, the opening 33 that is open in the Y direction of the terminal accommodating portion 30 faces, in the Y direction, an opening 22a formed in the side wall 22 of the corresponding wire accommodating portion 20. Accordingly, the opening 33 of the terminal accommodating portion 30 and the opening 22a of the wire accommodating portion 20 can be used to guide the wire 13 connected to the module-side terminal 12 accommodated in the terminal accommodating portion 30 into the wire accommodating portion 20. In other words, the opening 33 of the terminal accommodating portion 30 and the opening 22a of the wire accommodating portion 20 function as openings for guiding (inserting) the wire 13.

As shown in FIGS. 2 and 3, the opening 34 is open outward in the Y direction (to the side opposite to the wire accommodating portion 20). The opening 34 allows part of the terminal body 12a of the module-side terminal 12 accommodated in the terminal accommodating portion 30 to be exposed to the outside in the Y direction. The part of the terminal body 12a that is exposed from the opening 34 is electrically connected to a busbar B.

The busbars B used in the present embodiment are made of a conductive plate material. Each busbar B has two connection plates B1 that are respectively connected to a positive electrode and a negative electrode of adjacent battery cells C. Furthermore, each busbar B of the present embodiment has, between the connection plates B, a recess portion B2 that is recessed in the plate-thickness direction (Z direction) of the connection plates B1. The recess portion B2 is recessed in the direction (upward direction) away from the secondary battery BT in the Z direction.

The housing 11 is provided with busbar holding portions 40 that extend outward in the width direction from the side walls 22 and 32 on two sides in the width direction (two sides in the Y direction).

As shown in FIGS. 1 to 5, the busbar holding portions 40 each have one first holding piece 41 and two second holding pieces 42. The first holding piece 41 and the second holding pieces 42 extend further outward in the Y direction from the outermost position, in the Y direction, of the side walls 22 and 32 of the housing 11. The extension length is larger than the length in the Y direction of a busbar B. Note that FIGS. 2 to 4 show the first holding piece 41 and the second holding pieces 42 that are formed on the side wall 32 of the housing 11.

The first holding piece 41 and the second holding pieces 42 are formed while being shifted in the Z direction, which is a stack direction in which the housing 11 is stacked on the secondary battery BT. Also, the holding pieces 41 and 42 are configured to engage with the recess portion B2 of the busbar B on two sides in the Z direction, which is the direction in which with the housing 11 is stacked on the secondary battery BT.

The first holding piece 41 is located upside (to the side opposite to the secondary battery BT) relative to the second holding pieces 42. In other words, the second holding pieces 42 are located downside (on the secondary battery BT side) relative to the first holding piece 41.

The second holding pieces 42 are arranged at a distance from each other in the X direction. The distance is set to be shorter than the length in the X direction of the recess portion B2.

Furthermore, each second holding piece 42 has, at the leading end in the extending direction thereof, a projection 43 that projects upward, namely, toward the first holding piece 41 side in the Z direction. The projection 43 can engage with (abut against) the busbar B in the Y direction in a state in which the busbar B is attached to the busbar holding portion 40. Accordingly, the busbar B is prevented from disengaging from the busbar holding portion 40 in the Y direction.

Furthermore, the housing 11 includes restricting ribs 50 on the side, in the X direction, of the busbar holding portions 40 that is opposite to the module-side terminals 12, the restricting ribs 50 extending in the width direction. Each restricting rib 50 sandwiches, together with a busbar holding portion 40, a busbar. B in the vertical direction when the busbar B is attached to the busbar holding portion 40. More specifically, the restricting rib 50 is located above the busbar B in the Z direction, which is the vertical direction, and the busbar holding portion 40 is located below the busbar B in the Z direction, which is the vertical direction. Accordingly, movement of the busbar B in the Z direction is restricted. Here, for example, by using the terminal accommodating portion 30 of the module-side terminal 12 to restrict movement in the Z direction, it is possible to restrict the movement of the busbar B in the Z direction with the use of the module-side terminal 12.

The following will describe functions of the present embodiment.

The battery wiring module 10 of the present embodiment is arranged on the secondary battery BT that includes the plurality of battery cells C. The module-side terminals 12 of the battery wiring module 10 are connected to the busbars B that connect the positive and negative electrodes of the battery cells C lined up in the X direction. One end of a wire 13 is connected to a module-side terminal 12, and the other end (not-shown) of the wire 13 is connected to a not-shown battery monitoring ECU. The battery monitoring ECU can monitor voltages of the battery cells C.

In the battery wiring module 10 of the present embodiment, the busbars B are held by the busbar holding portions 40 until the busbars B are connected (for example, welded) to the secondary battery BT. At this time, while being inserted into the recess portions B2 of the busbars B, the busbar holding portions 40 are configured to engage with, using the holding pieces 41 and 42, the busbars B in the Z direction.

The following will describe effects of the present embodiment.

(1) As a result of the busbar holding portions 40 being provided that engage with and hold the busbars B in the Z direction, which is the stack direction in which the housing 11 is stacked on the battery cells C, the busbars B can be held on the battery wiring module 10 (housing 11) until they are connected to the secondary battery BT.

(2) As a result of the holding pieces 42 of the busbar holding portions 40 each having the projection 43, serving as a restricting portion, that restricts movement of a busbar B in the disengaging direction, it is possible to prevent the busbars B from disengaging from the busbar holding portions 40.

Note that the above-described embodiment can be modified and implemented in the following manner. The above-described embodiment and the following modifications can be implemented in a suitable combination without technically contradicting each other.

In the above-described embodiment, a busbar holding portion 40 is constituted by one first holding piece 41 located relatively upward and two second holding pieces 42 located relatively downward, but the present invention is not limited to this configuration. For example, the following configurations may also be employed.

Figure 6:
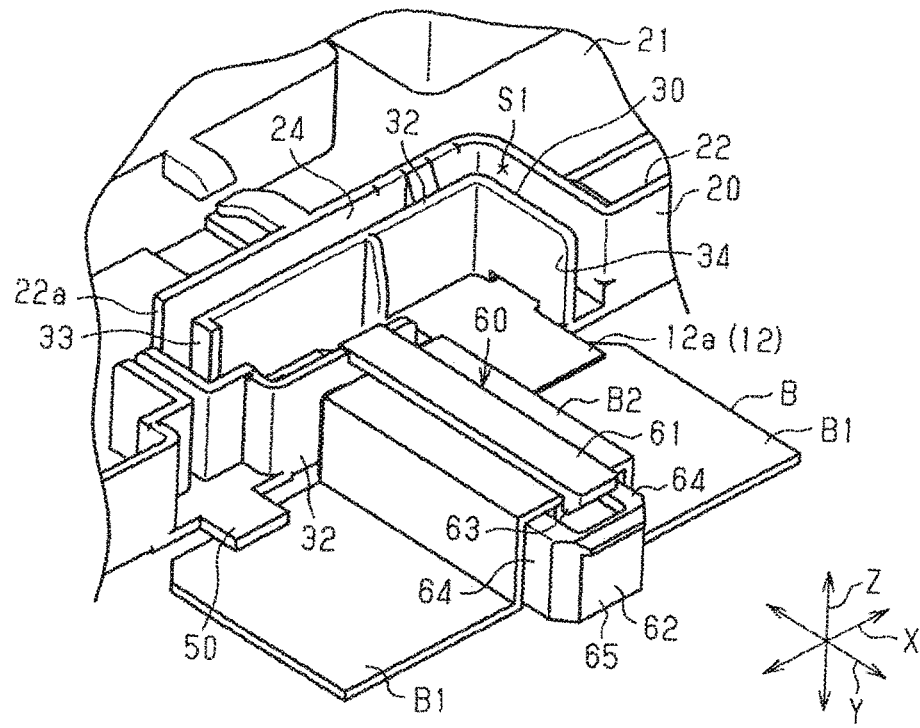
FIG. 6 is a perspective view illustrating part of a battery wiring module according to a modification.
Figure 7:
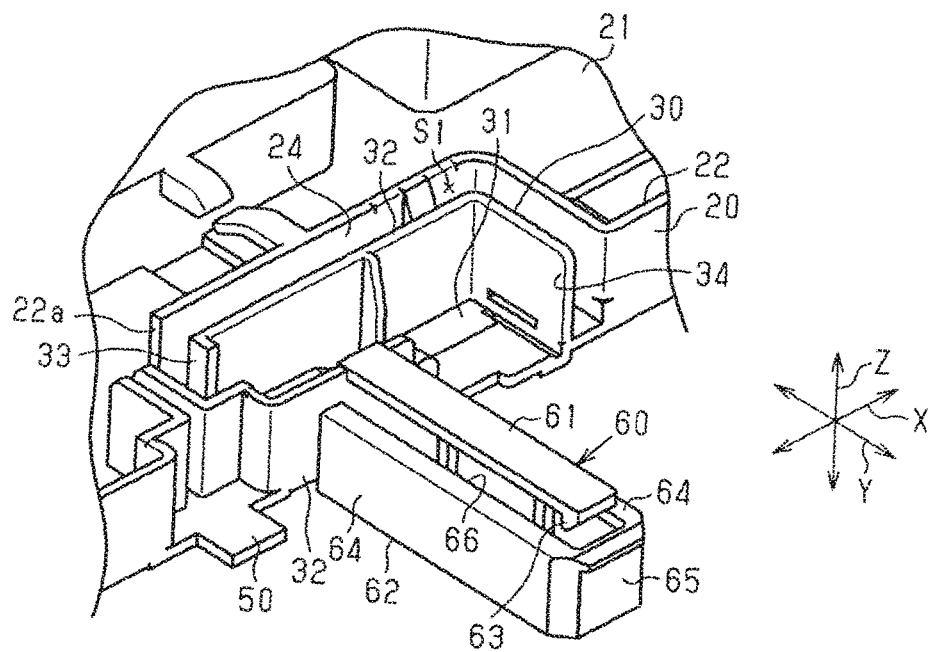
FIG. 7 is a perspective view of the battery wiring module according to this modification, illustrating a state in which a busbar and a module-side terminal are omitted.

As shown in FIGS. 6 and 7, a busbar holding portion 60 includes a first holding piece 61 and a second holding piece 62.

The first holding piece 61 and the second holding piece 62 are formed while being shifted in the Z direction, which is the stack direction in which the housing 11 is stacked on the secondary battery BT. The holding pieces 61 and 62 are configured to engage with the recess portion B2 of a busbar B on two sides in the Z direction, which is the stack direction in which the housing 11 is stacked on the secondary battery BT. The first holding piece 61 is located upside (on the side opposite to the secondary battery BT) relative to the second holding piece 62. In other words, the second holding piece 62 is located downside (on the secondary battery BT side) relative to the first holding piece 61.

The first holding piece 61 extends further outward in the Y direction from the outermost position, in the Y direction, of the side wall 32. The first holding piece 61 has, at a leading end in the extending direction thereof, a projection 63 that projects downward, namely, to the second holding piece 62 side in the Z direction. The projection 63 can engage with (abut against) the busbar B in the Y direction in a state in which the busbar B is attached to the busbar holding portion 60. Accordingly, the busbar B is prevented from disengaging from the busbar holding portion 60 in the Y direction.

The second holding piece 62 has a structure in which two extending portions 64 that extend from the side wall 32 and are arranged at a distance from each other in the X direction are connected to each other at leading ends thereof by a connecting portion 65. Accordingly, an opening (through opening) 66 that is open in the Z direction is formed by being enclosed by the side wall 32, the two extending portions 64, and the connecting portion 65. The opening 66 has an area slightly larger than that of the first holding piece 61 when viewed in the Z direction. Accordingly, removal from a mold in the case of insert molding is easy.

Figure 8:
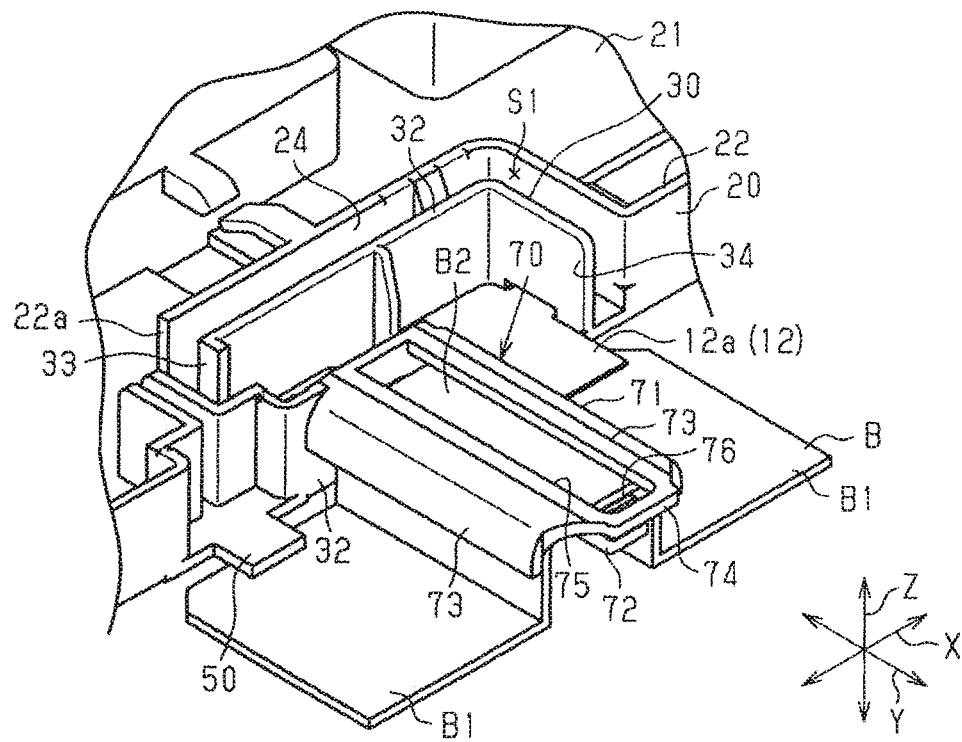
FIG. 8 is a perspective view illustrating part of a battery wiring module according to a modification.
Figure 9:
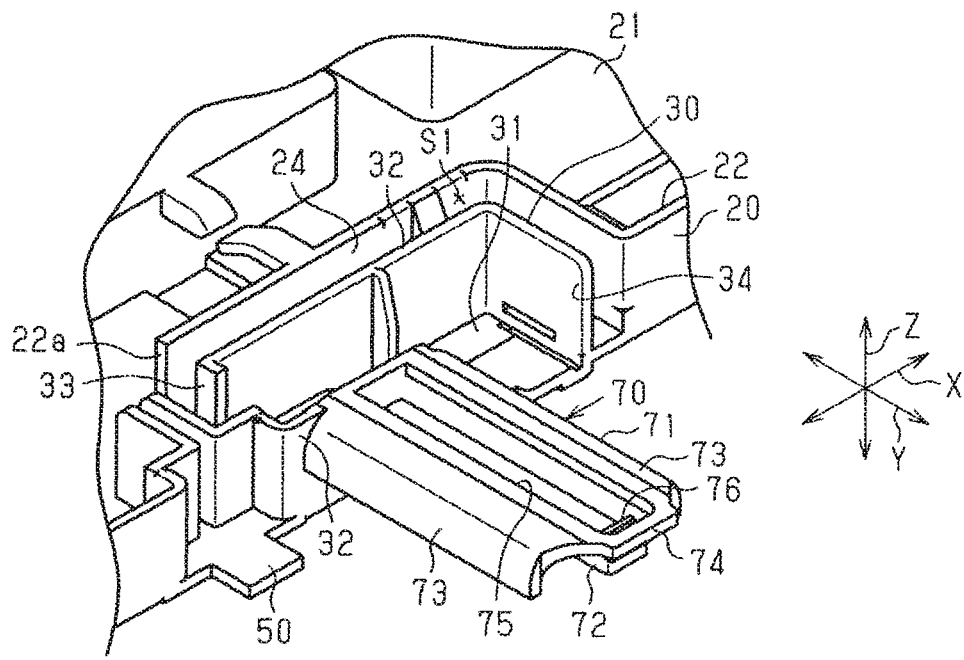
FIG. 9 is a perspective view of the battery wiring module according to this modification, illustrating a state in which a busbar and a module-side terminal are omitted.
Figure 10:
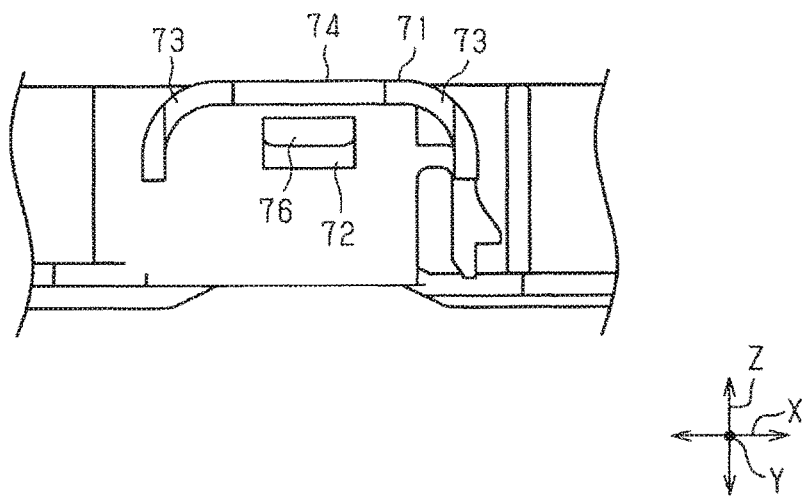
FIG. 10 is a side view of the battery wiring module according to this modification, illustrating the state in which the busbar and the module-side terminal are omitted.

As shown in FIGS. 8 to 10, a busbar holding portion 70 includes a first holding piece 71 and a second holding piece 72.

The first holding piece 71 and the second holding piece 72 are formed while being shifted in the Z direction, which is the stack direction in which the housing 11 is stacked on the secondary battery BT. The holding pieces 71 and 72 are configured to engage with the recess portion B2 of a busbar B on two sides in the Z direction, which is the stack direction in which the housing 11 is stacked on the secondary battery BT. The first holding piece 71 is located upside (on the side opposite to the secondary battery BT) relative to the second holding piece 72. In other words, the second holding piece 72 is located downside (on the secondary battery BT side) relative to the first holding piece 71.

The first holding piece 71 has a structure in which two extending portions 73 that extend from the side wall 32 and are arranged at a distance from each other in the X direction are connected to each other at leading ends thereof by a connecting portion 74. Accordingly, an opening (through opening) 75 that is open in the Z direction is formed by being enclosed by the side wall 32, the two extending portions 73, and the connecting portion 74. The opening 75 has an area slightly larger than that of the second holding piece 72 when viewed in the Z direction. Accordingly, removal from a mold in the case of insert molding is easy. Furthermore, the two extending portions 73 are curved on the outer sides in the X direction (on the sides on which the extending portions 73 arranged at a distance from each other in the X direction are provided).

The second holding piece 72 extends further outward in the Y direction from the outermost position, in the Y direction, of the side wall 32. The second holding piece 72 has, at a leading end in the extending direction thereof, a projection 76 that projects upward, namely, to the first holding piece 71 side in the Z direction. The projection 76 can engage with (abut against) the busbar B in the Y direction in a state in which busbar B is attached to the busbar holding portion 70. Accordingly, the busbar B is prevented from disengaging from the busbar holding portion 70 in the Y direction.

Note also that the configurations above are merely examples, and for example, the shape of a busbar holding portion may be changed as appropriate as long as the busbar holding portion sandwiches a busbar B in the vertical direction.

The above-described embodiment employs a configuration in which the projections 43 are provided, but may also employ a configuration without the projections 43. Furthermore, if the configuration without the projections 43 is employed, a configuration as shown in FIGS. 11 and 12 may also be employed.

Figure 11:
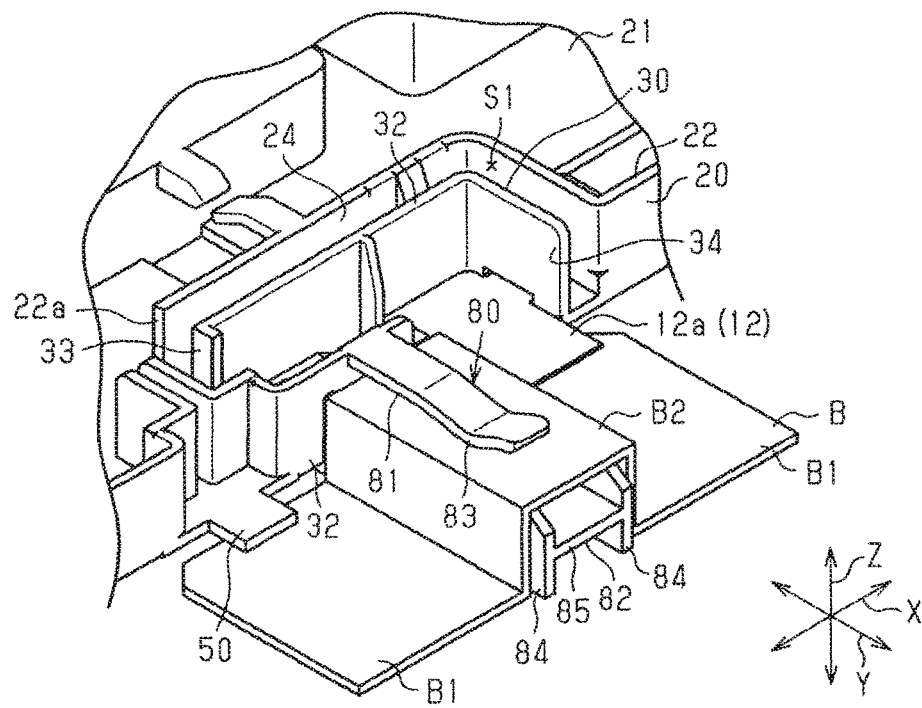
FIG. 11 is a perspective view illustrating part of a battery wiring module according to a modification.
Figure 12:
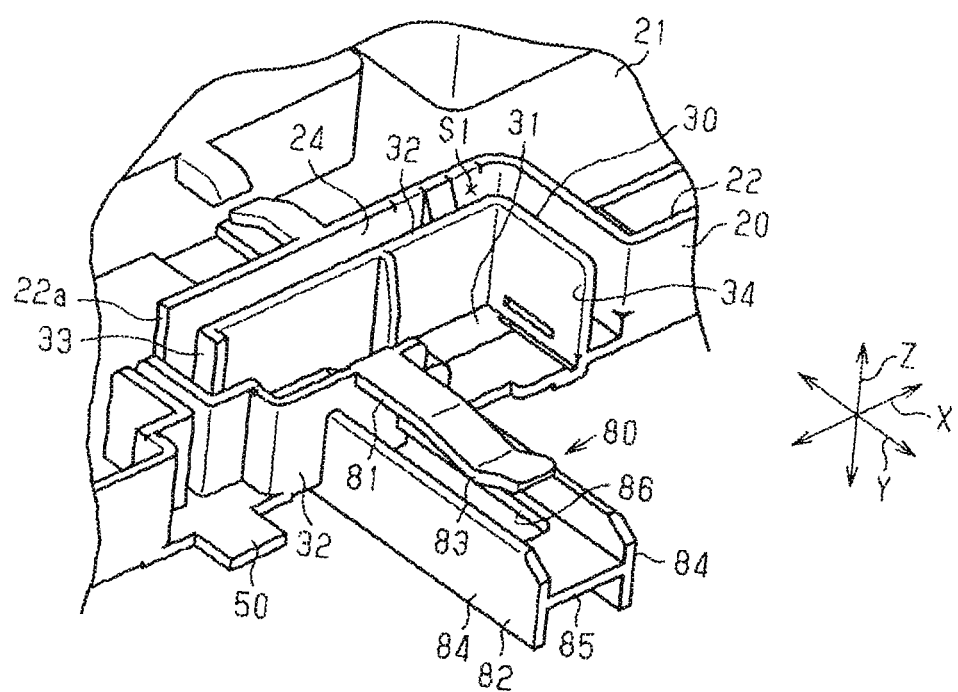
FIG. 12 is a perspective view of the battery wiring module according to this modification, illustrating a state in which a busbar and a module-side terminal are omitted.

As shown in FIGS. 11 and 12, a busbar holding portion 80 includes a first holding piece 81 and a second holding piece 82.

The first holding piece 81 and the second holding piece 82 are formed while being shifted in the Z direction, which is the stack direction in which the housing 11 is stacked on the secondary battery BT. The holding pieces 81 and 82 are configured to engage with the recess portion B2 of a busbar B on two sides in the Z direction, which is the stack direction in which the housing 11 is stacked on the secondary battery BT. The first holding piece 81 is located upside (on the side opposite to the secondary battery BT) relative to the second holding piece 82. In other words, the second holding piece 82 is located downside (on the secondary battery BT side) relative to the first holding piece 81.

The first holding piece 81 extends further outward in the Y direction from the outermost position, in the Y direction, of the side wall 32. The first holding piece 81 has, at a midway position in the extending direction thereof, a bent portion 83 that is bent downward, namely, to the second holding piece 82 side in the Z direction. The bent portion 83 is configured to apply a biasing force for biasing the busbar B to the lower side when the busbar B is attached to the busbar holding portion 80. Accordingly, the busbar B is prevented from disengaging from the busbar holding portion 80 in the Y direction. The bent portion 83 corresponds to the restricting portion and a biasing force applying portion.

The second holding piece 82 has a structure in which two extending portions 84 that extend from the side wall 32 and are arranged at a distance from each other in the X direction are connected to each other at leading ends thereof by a connecting portion 85. Accordingly, an opening (through opening) 86 that is open in the Z direction is formed by being enclosed by the side wall 32, the two extending portions 84, and the connecting portion 85. The opening 86 has an area slightly larger than that of the first holding piece 81 when viewed in the Z direction. Accordingly, removal from a mold in the case of insert molding is easy.

LIST OF REFERENCE NUMERALS

10 . . . Battery wiring module
11 . . . Housing
12 . . . Module-side terminal
13 . . . Wire
40 . . . Busbar holding portion
41, 42 . . . Holding piece
43 . . . Projection (restricting portion)
50 . . . Restricting rib
60 . . . Busbar holding portion
61, 62 . . . Holding piece
63 . . . Projection (restricting portion)
70 . . . Busbar holding portion
71, 72 . . . Holding piece
76 . . . Projection (restricting portion)
80 . . . Busbar holding portion
81, 82 . . . Holding piece
83 . . . Bent portion (biasing force applying portion)
B . . . Busbar
B2 . . . Recess portion
C . . . Battery cell

What is claimed is:
1. A battery wiring module, comprising:
a module-side terminal configured to be electrically connected to a busbar for connecting battery terminals of a plurality of battery cells to each other;
a wire that has one end to which the module-side terminal is connected; and
a housing in which the wire and the module-side terminal are housed,
wherein the busbar is configured to connect the battery terminals of the plurality of battery cells to each other, and has a recess portion that is recessed in a stack direction in which the housing is stacked on the battery cells, and
the battery wiring module further comprises a busbar holding portion configured to be inserted into the recess portion, and engage with and hold the busbar in the stack direction in which the housing is stacked on the battery cells,
wherein the busbar holding portion includes elongated holding pieces that are located one above another in the stack direction such that one of the elongated holding pieces engages an upper surface of the bus bar and another of the elongated holding pieces engages a lower surface of the bus bar, and
the elongated holding pieces each have a restricting portion configured to restrict movement of the busbar in a disengaging direction in which the busbar disengages from the busbar holding portion.

2. The battery wiring module according to claim 1, wherein the restricting portion is a projection that projects from a corresponding one of the elongated holding pieces and is configured to abut against the busbar in the disengaging direction.

3. The battery wiring module according to claim 1, wherein the restricting portion includes a biasing force applying portion configured to apply a biasing force to the busbar in a plate-thickness direction of the busbar.

* * * * *